(12) United States Patent
Stadtlander

(10) Patent No.: US 8,454,775 B2
(45) Date of Patent: Jun. 4, 2013

(54) BOND AND STITCH REPAIR FOR DELAMINATED COMPOSITE

(75) Inventor: Daniel M. Stadtlander, West Hartford, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 13/194,095

(22) Filed: Jul. 29, 2011

(65) Prior Publication Data

US 2013/0025769 A1    Jan. 31, 2013

(51) Int. Cl.
*F04D 29/38* (2006.01)

(52) U.S. Cl.
USPC ............................................ 156/98; 264/36.1

(58) Field of Classification Search
USPC ............................................ 156/98; 264/36.1
See application file for complete search history.

(56) References Cited

U.S. PATENT DOCUMENTS

| | | | |
|---|---|---|---|
| 4,685,864 A | 8/1987 | Angus et al. | |
| 5,266,139 A | 11/1993 | Yokota et al. | |
| 5,350,614 A * | 9/1994 | Chase et al. | 428/53 |
| 5,490,602 A | 2/1996 | Wilson et al. | |
| 6,106,646 A | 8/2000 | Fairbanks | |
| 6,327,994 B1 | 12/2001 | Labrador | |
| 6,385,836 B1 | 5/2002 | Coltrin | |
| 6,431,837 B1 | 8/2002 | Velicki | |
| 7,008,689 B2 | 3/2006 | Hawkins et al. | |
| 7,247,212 B2 | 7/2007 | Kostar et al. | |
| 7,572,347 B2 | 8/2009 | Bogue | |
| 7,875,141 B2 | 1/2011 | Bogue et al. | |
| 7,883,760 B2 | 2/2011 | Bogue | |
| 2003/0170441 A1 * | 9/2003 | Boyle | 428/297.4 |
| 2007/0275212 A1 | 11/2007 | Stadtlander et al. | |
| 2008/0233346 A1 | 9/2008 | Bogue et al. | |
| 2008/0295950 A1 | 12/2008 | Mack et al. | |
| 2009/0148275 A1 | 6/2009 | Bogue et al. | |
| 2010/0015394 A1 * | 1/2010 | Morrison et al. | 428/137 |
| 2010/0296942 A1 * | 11/2010 | Jevons | 416/229 R |

FOREIGN PATENT DOCUMENTS

DE    3909560 A1    9/1990

OTHER PUBLICATIONS

The European Search Report dated Oct. 30, 2012 for European Application No. 12178464.9.

\* cited by examiner

*Primary Examiner* — Jeff Aftergut
*Assistant Examiner* — Jaeyun Lee
(74) *Attorney, Agent, or Firm* — Kinney & Lange, P.A.

(57) ABSTRACT

A method of repairing delaminated plies of a composite includes drilling a plurality of holes in the plies, stitching one or more tows into the plurality of holes, and tensioning the tows. The holes are disposed across an area of the plies that is delaminated. The method introduces a resin into the area of the plies that is delaminated and cures the resin. Curing of the composite can be performed prior to the stitching and the tensioning of the one or more tows and can be performed by the tensioning of the one or more tows. Optionally, one or more additional plies can be applied to the repaired area and/or a portion of the one or more tows that extends above a surface the plies can be removed.

13 Claims, 7 Drawing Sheets

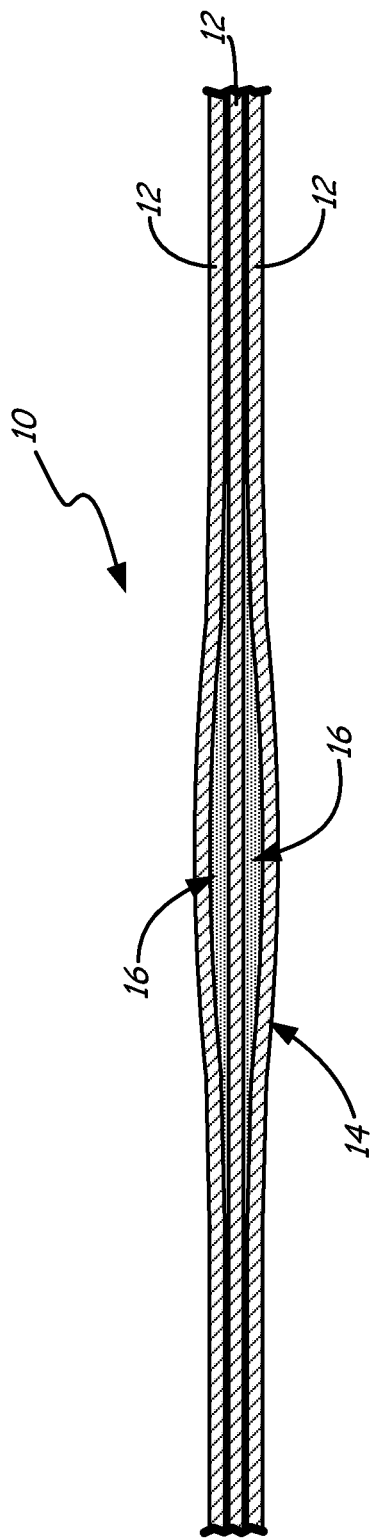

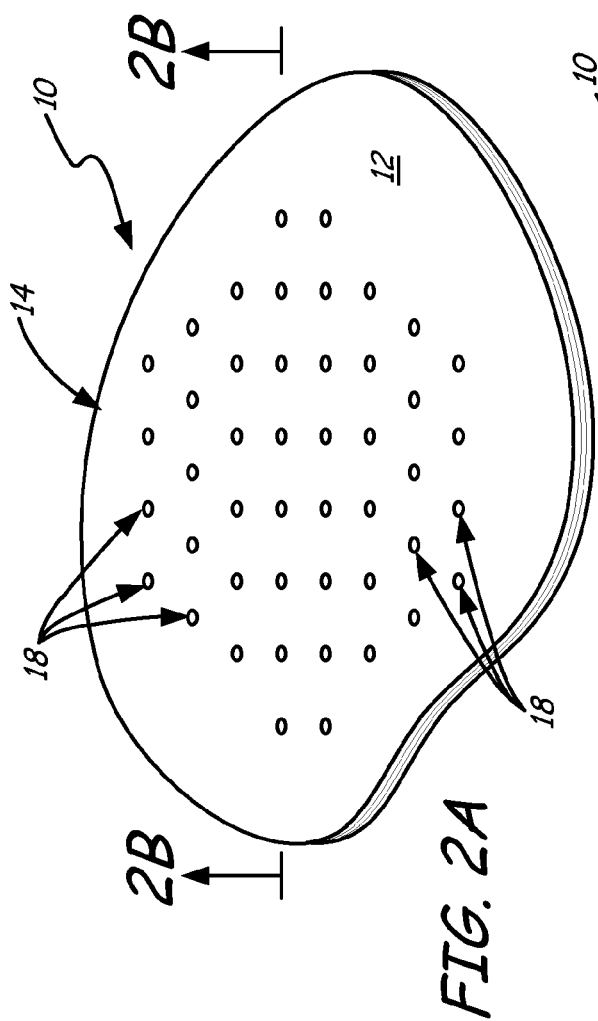
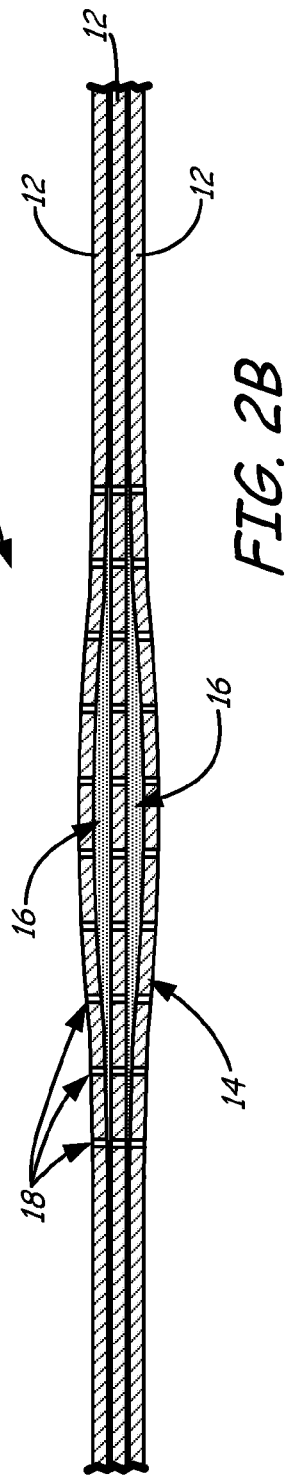
FIG. 2A
FIG. 2B

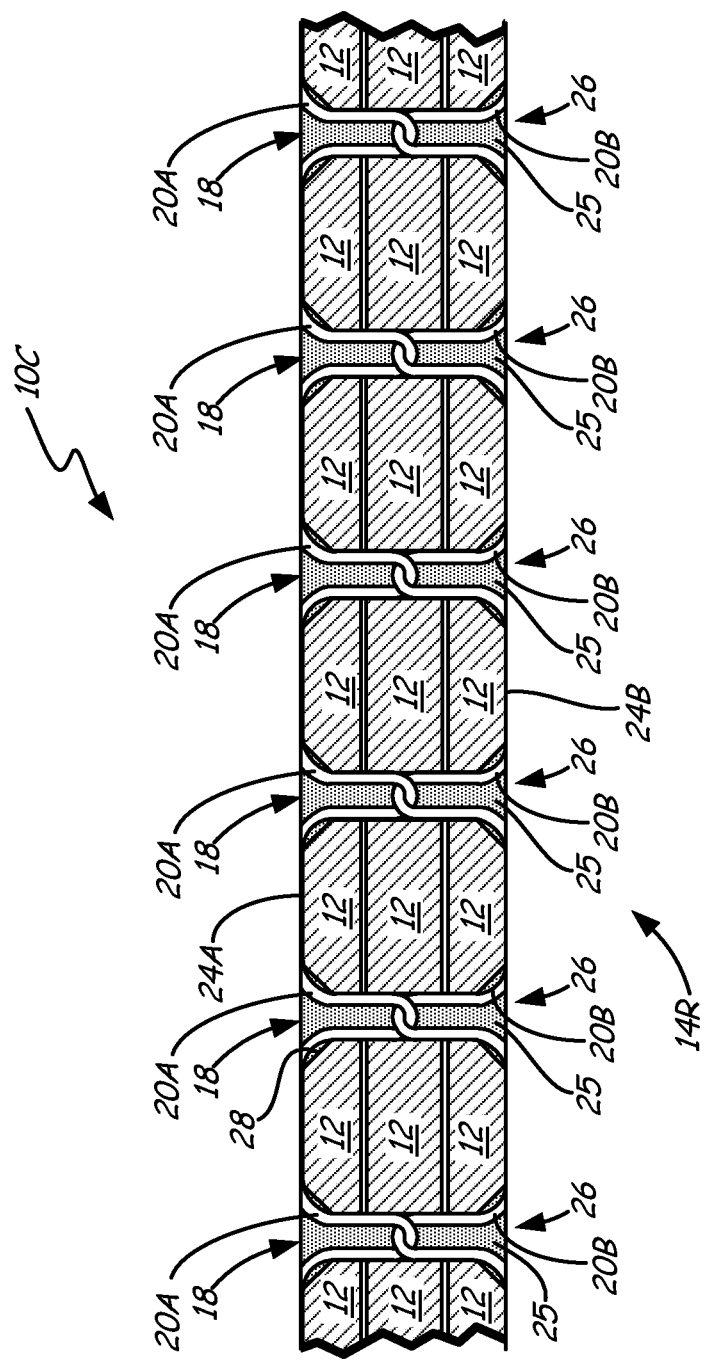

BOND AND STITCH REPAIR FOR DELAMINATED COMPOSITE

BACKGROUND

The present invention relates to composite structures. More particularly, the present invention relates to repairing composite structures that have experienced a delamination.

Composite structures are commonly used in, for example, gas turbine engines. Engine manufacturers are continuously developing lighter weight gas turbine engines so as to improve engine operating efficiencies. One of the most effective ways to improve the structural performance of rotating components is to reduce their weight. This results in lower rotational inertia forces, which reduces the internal loads experienced by the components. Thus, light weight composite structures have been adopted within the industry not just for stator components such as vanes and seals, but additionally for rotating structures such as blades.

One composite structure typically used in aerospace and other applications is a composite having a face skin made of laminated plies with a resin matrix. The plies can be of known lightweight materials such as carbon fiber and/or fiberglass. In one embodiment, the face skin, along with a back skin, sandwich a core that is formed of honeycomb or some other lightweight material. The core is inserted between and bonded to the face skin and the back skin.

During operation of the gas turbine engine, the composite structure is subjected to loads and other environmental factors that result from cyclic stresses, impact, elevated temperatures, and other phenomena. The loads are transferred from one layer to the next by shear through the resin matrix or interface of the plies. The interlaminar shear forces, which transfer loads from one ply to the next, can initiate delamination of the composite structure.

Delamination is particularly problematic for rotating composite components as typical repairs such as scarfing, where the delaminated portion of the plies are ground out and replaced with new plies, are not considered structurally adequate to meet impact requirements. As a result, composite components must be scrapped rather than repaired at great cost to airframers.

SUMMARY

A method of repairing delaminated plies of a composite includes drilling a plurality of holes in the plies, stitching one or more tows into the plurality of holes, and tensioning the tows. The holes are disposed across an area of the plies that is delaminated. The method introduces a resin into the area of the plies that is delaminated and cures the resin. Curing of the composite can be performed prior to the stitching and the tensioning of the one or more tows and can be performed by the tensioning of the one or more tows. Optionally, one or more additional plies can be applied to the repaired area. Similarly, in another embodiment a portion of the one or more of the tows that extend above an outer surface the plies can be removed.

BRIEF DESCRIPTION OF THE DRAWINGS

FIG. 1 is a cross-sectional view of a composite with plies that have a delaminated area.

FIG. 2A is a top view of a composite with a plurality of holes drilled in the delaminated area of the composite.

FIG. 2B is a cross-sectional view of the composite through the delaminated area.

FIG. 5C is a cross-sectional view of yet another embodiment of the repaired composite with the tows removed flush to first and second surfaces of the composite.

DETAILED DESCRIPTION

Figure 3:
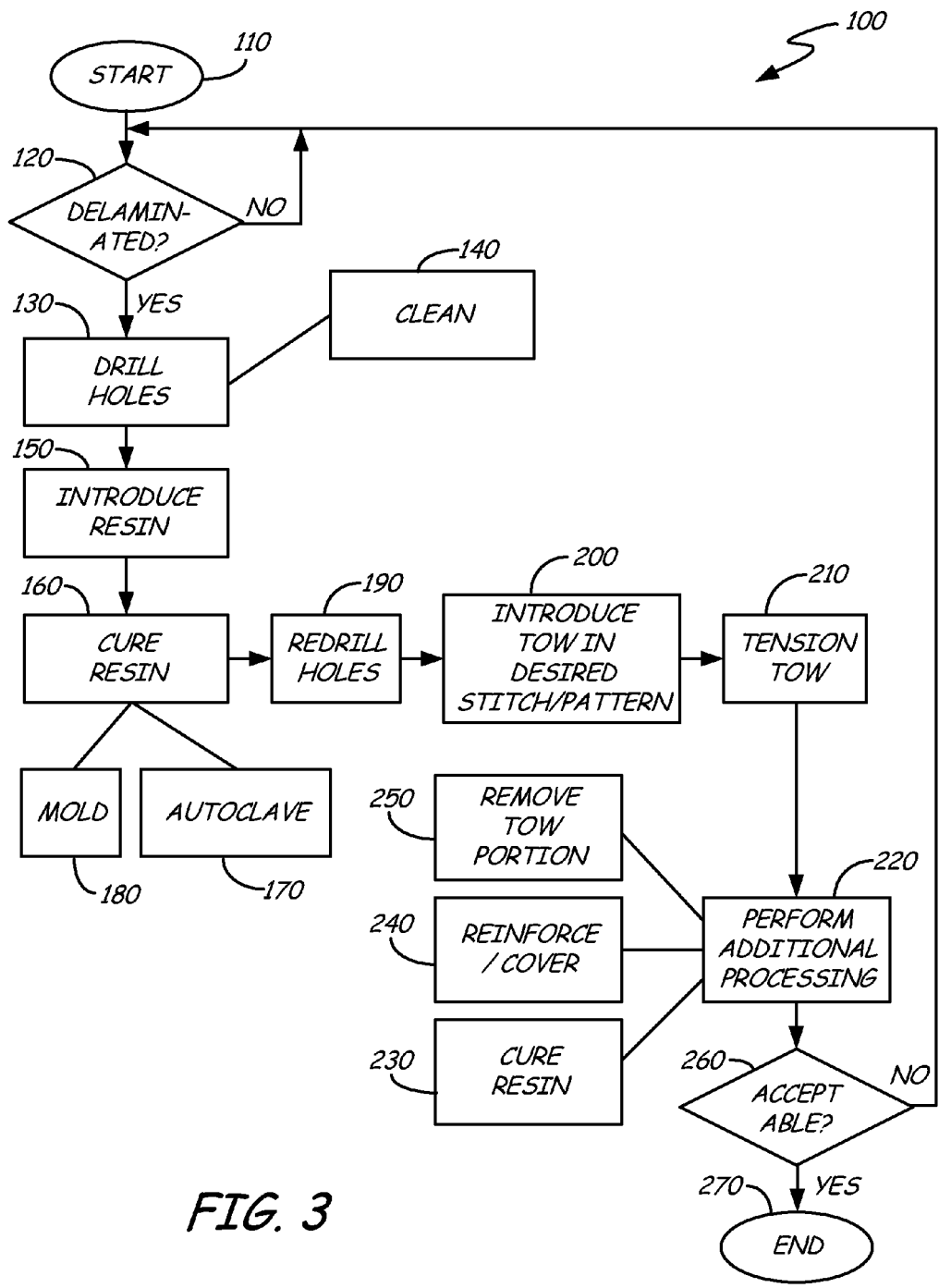
FIG. 3 is a flow diagram of a first method of repairing the composite with the delaminated area.

FIG. 1 shows a sectional view of a composite 10 with a plurality of laminated plies 12 that have a delaminated area 14. The composite 10 is potentially applicable to a wide range of industries including the aerospace industry, and can be used for rotor components of gas turbine engines.

A core or additional plies of composite 10 are not illustrated in FIG. 1 and may have been removed due to delaminated area 14 leaving only plies 12. In the embodiment shown in FIG. 1, plies 12 comprise a lightweight material used in the aerospace industry such as Kevlar®, carbon fiber, fiberglass, basalt, and/or ceramic fiber. A resin (not numbered) is cured to form a matrix and bond the plies together. Non-exhaustive examples of resins that are stable in the harsh aerospace environment include epoxy, polyimide, bismaleimide (BMI) and cyanate ester. The material of the plies 12 and resin are selected, in part, based on stability in the operating environment where the composite 10 is to be located.

Plies 12 have become delaminated due to loads, defects, and other environmental factors that result from cyclic stresses, impact, elevated temperatures, and other phenomena. The loads are transferred from one layer to the next by shear through the resin or interfacing ply 12. The interlaminar shear forces, which transfer loads from one ply to the next ply, have in the embodiment shown in FIG. 1, initiated delamination of the composite structure. Thus, delaminated area 14 has developed with one or more cavities 16 disposed between plies 12.

FIG. 2A is a top view of composite 10 with a plurality of holes 18 drilled in delaminated area 14 (generally delimitated by dashed lines) of composite 10. FIG. 2B is a cross-sectional view of composite 10 through delaminated area 14.

Holes 18 are disposed across delaminated area 14 at spaced intervals. In the embodiment shown in FIG. 2A, holes 18 are disposed at intervals across substantially all of delaminated area 14 and a portion of composite 10 that is not delaminated. The extent of the area which the holes 18 cover, and the size and spacing of the holes 18 are determined by a structural analysis. In such an analysis, the combined tensile and shear strength of delaminated area 14 and composite 10 are determined including any degradation that results from drilling holes 18. The combined tensile and shear strength of the tow and resin disposed in holes 18 in delaminated area 14 (a process that will be discussed subsequently) should exceed the combined tensile and shear strength values required for composite 10. The structural analysis would also determine the static and fatigue capability of composite 10 after repair including the retention of properties after environmental exposure.

In the embodiment shown in FIG. 2A, holes 18 are drilled to cover delaminated area 14 and portions of composite 10 that are not delaminated. In one embodiment, holes 18 have a diameter of between 0.03 and 0.05 inches (0.08 and 0.13 cm). The diameter of holes 18 will vary and is dependant upon operational and structural requirements for composite 10. Ideally, holes 18 should be drilled in a clean room environment so that the drilling of holes 18 does not introduce contaminants into composite 10.

FIG. 3 shows a flow diagram of a first method of repairing composite 10 with delaminated area 14. Prior to start 110, a core or additional plies of composite 10 (FIGS. 1A and 1B) can be removed to expose delaminated area 14. First repair method 100 begins at start 110 and proceeds to an inspection step 120. Inspection 120 determines if composite 10 has a delamination and if the delamination is capable of repair or if composite 10 should instead be scrapped and replaced. Inspection can be performed by a tap test, a sonic test, or by other known means. For instance, composite 10 would be scrapped if plies 12 are punctured rather than delaminated. Additional factors determining if repair should occur include the operational environment of composite 10 and the adequacy of the repair to meet required mechanical properties based on structural analysis.

If composite 10 can be repaired, method 100 proceeds to step 130 where holes 18 (FIGS. 2A and 2B) are drilled in composite 10 in delaminated area 14. In some embodiments, after holes 18 are drilled a cleaning solvent can be flushed through holes 18 in step 140. Resin 25 (FIGS. 5A-5C) is introduced into delaminated area 14 and holes 18 using a syringe, a vacuum draw procedure such as vacuum bagging or resin transfer molding, a pressurized draw procedure, or another procedure. Delaminated area 14 and holes 18 should be thoroughly saturated with resin 25.

At step 160, composite 10 is cured. The specific curing conditions depend, in part, on the particular resin and composite makeup. In an exemplary embodiment, composite 10 is vacuum bagged and resin 25 is introduced into delaminated area 14. Composite 10 is then placed in an autoclave at step 170 and cured at high temperature and pressure to achieve a bond. Excess resin 25 is bleed off composite 10 and is trapped in bag. In alternative embodiments, composite 10 can be placed in a mold 180 or another known device for curing resin 25.

Figure 5A:
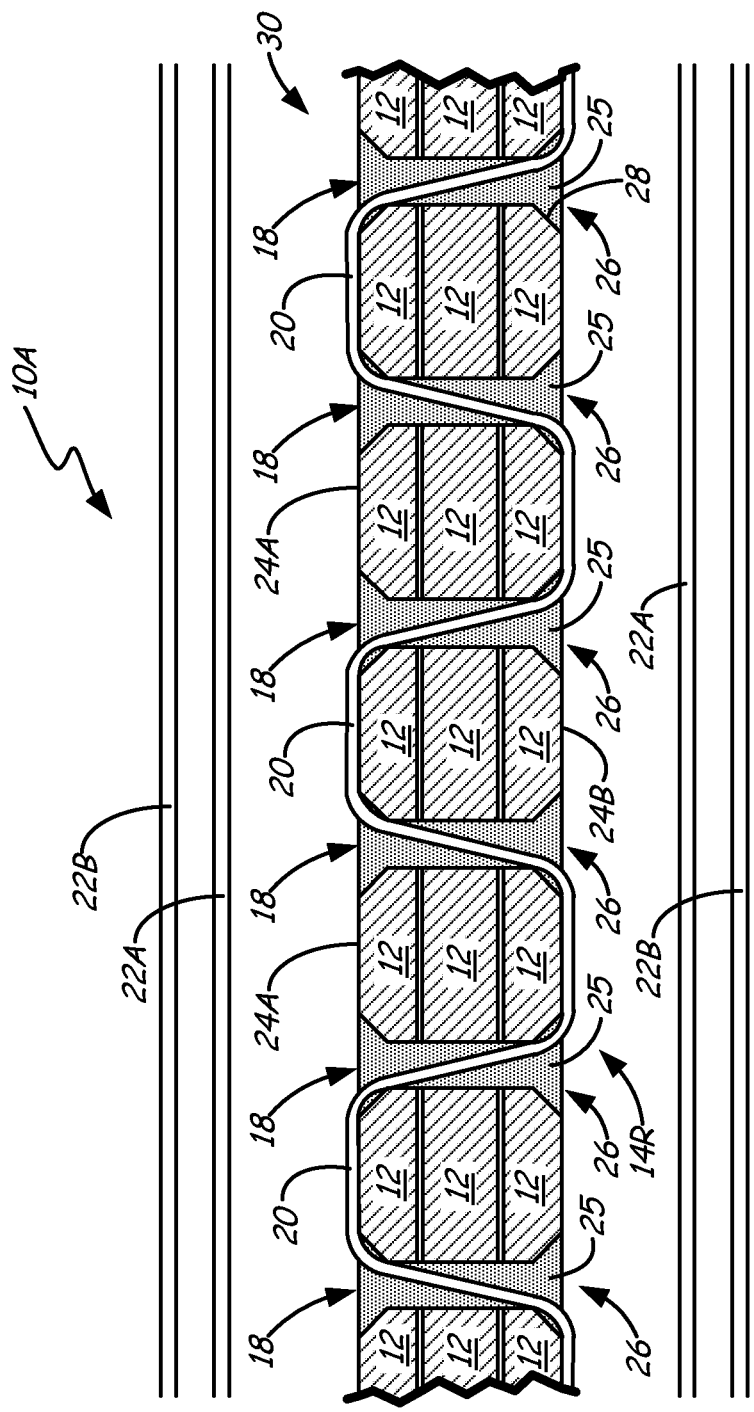
FIG. 5A is a cross-sectional view of one embodiment of the repaired composite with a tow extending therethrough in an over-under stitch manner and additional plies being applied thereto.

After curing of the resin 25 in step 160, holes 18 are redrilled in composite 10 at step 190. Tow(s) 20 or 20A and 20B (FIGS. 5A-5C) are introduced into holes 18 at step 200 in a desired stitch and pattern. Virtually any type of stitch 30 or 32 can be used including a lock stitch 32 (FIGS. 5B and 5C) or an over/under stitch 30 (FIG. 5A). Similarly, the stitch pattern can be of any known type including a straight, a zigzag, or a saw tooth pattern. In addition to physically introducing tow(s) 20 or 20A and 20B into holes 18, stitching step 200 utilizes known techniques for introducing resin 25 to tow(s) 20 or 20A and 20B and holes 18. For example, tow(s) 20 or 20A and 20B can be preimpregnated with the resin 25. Other known techniques can be used and include but are not limited to, a wet lay-up process and resin transfer molding.

After stitching in step 200, method 100 moves to step 210 where tow(s) 20 or 20A and 20B are held in tension while additional processing steps 210 are optionally performed. Additional processing steps 210 can include curing the resin 25 at step 230 using an autoclave, mold, the pressure caused by the tension of tow(s) 20 or 20A and 20B, or another known method or device. Tensioning tow(s) 20 or 20A and 20B provides composite 10 with the structural integrity for the operating environment where the composite 10 is to be located. Thus, the amount of tension applied to the tow(s) 20 or 20A and 20B can vary from embodiment to embodiment.

As will be discussed subsequently, additional plies can be applied at step 240 to the repaired area, which had previously been the delaminated area 14 and other portions of composite 10. The additional plies provide reinforcement and cover repaired area to help keep contaminants from being introduced to the interior of composite 10. The additional plies are cured at step 230 to composite 10.

In another embodiment, processing steps 220 can include a step 250 that removes tow(s) 20 or 20A and 20B from the one or more surfaces of composite 10. The removal leaves tow(s) 20 or 20A and 20B in holes 18 flush with one or more surfaces of composite 10. The removal of tow(s) 20 or 20A and 20B can be accomplished by known techniques including grinding, laser removal, or other cutting methods.

After processing step 220, method 100 proceeds to an inspection step 260. Inspection 260 determines if delaminated area 14 of composite 10 has been fully repaired. If composite 10 is not repaired composite 10 should be scrapped. Inspection can be performed by a tap test, a sonic test, or by other known means.

Figure 4:
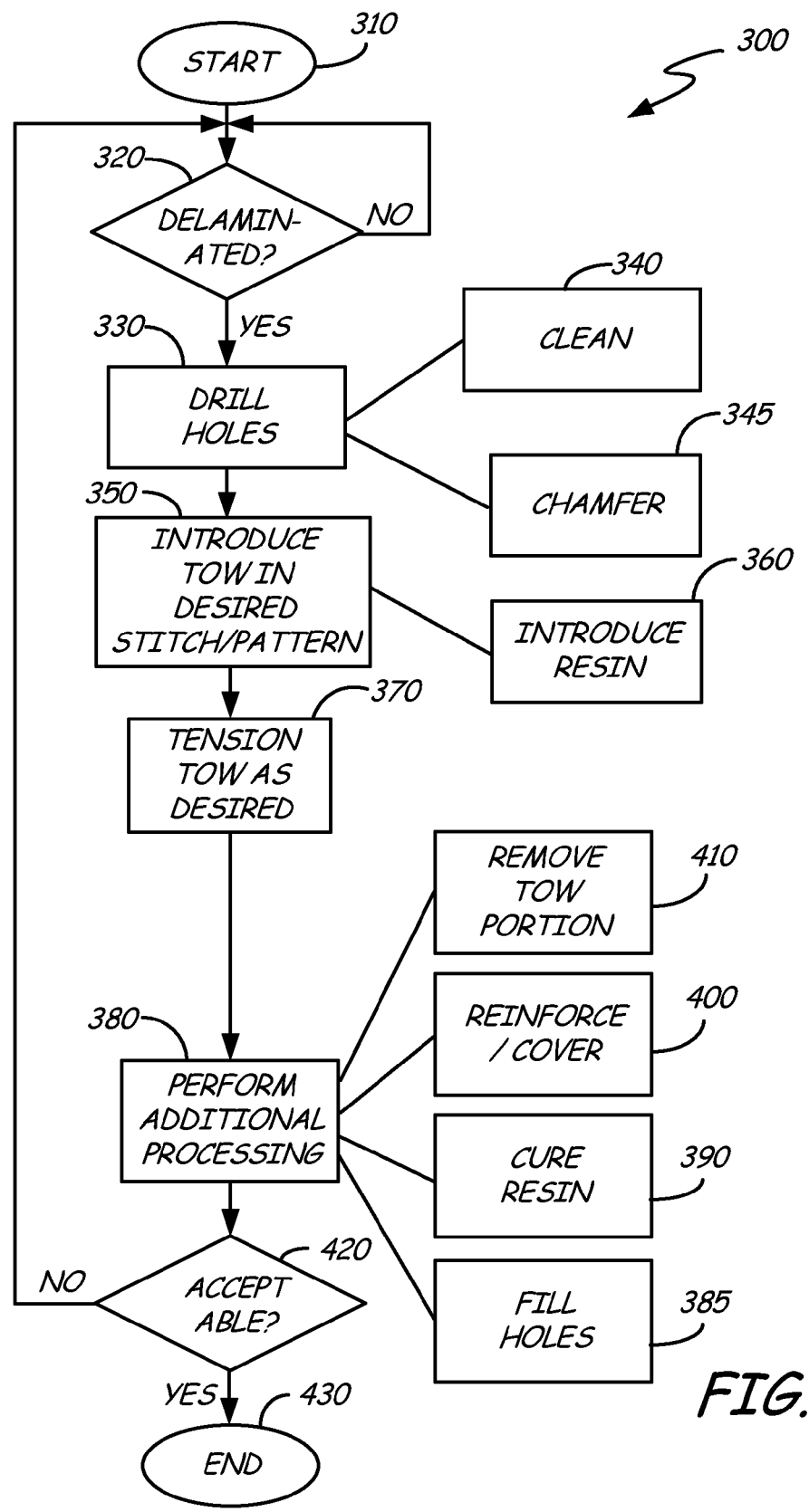
FIG. 4 is a flow diagram of a second method of repairing the composite with the delaminated area.

FIG. 4 shows a flow diagram of a second method 300 of repairing composite 10 with delaminated area 14. Similar to first repair method 100, second repair method 300 begins at start 310 and proceeds to an inspection step 320. Inspection 320 determines if composite 10 has a delamination and if the delamination is capable of repair or if composite 10 should instead be scrapped and replaced. Inspection can be performed by a tap test, a sonic test, or by other known means.

If composite 10 can be repaired, method 300 proceeds to step 330 where holes 18 (FIGS. 2A and 2B) are drilled in composite 10 in delaminated area 14. In some embodiments, after holes 18 are drilled a cleaning solvent can be flushed through holes 18 in step 340. Additionally, with step 330 or as a separate step 345, chamfers 28 (FIGS. 5A-5C) can be formed in each hole along first and second surfaces 24A and 24B.

Tow(s) 20 or 20A and 20B (FIGS. 5A-5C) are introduced into holes 18 at step 350 in a desired stitch 30 or 32 and pattern. Virtually any type of stitch can be used including lock stitch 32 (FIGS. 5B and 5C) or over/under stitch 30 (FIG. 5A). Similarly, the stitch pattern can be of any known type including a straight, a zigzag, or a saw tooth pattern.

In some embodiments, resin 25 (FIGS. 5A-5C) may not be necessary and need not be applied to composite 10 for repair. In other embodiments, resin 25 is introduced at step 360 into delaminated area 14 and holes 18 prior to, during, or after introduction of tow(s) 20 or 20A and 20B into holes 18. As discussed previously, resin 25 can be introduced using a syringe, a vacuum draw procedure such as vacuum bagging or resin transfer molding, a pressurized draw procedure, or another procedure. Alternatively or in addition to the aforementioned methods, known techniques for introducing resin 25 to holes 18 (as discussed in step 285) and tow(s) 20 or 20A and 20B can be used in step 360. For example, tow(s) 20 or 20A and 20B can be preimpregnated with the resin 25. Additional techniques include but are not limited to, a wet lay-up process and resin transfer molding.

Method 300 moves to step 370 where tow(s) 20 or 20A and 20B are held in tension while additional processing steps 380 are optionally performed. Additional processing steps 380 can include step 385 of filling holes 18 with resin 25 while tow(s) 20 or 20A and 20B are in tension using known techniques such as a syringe, a vacuum draw procedure such as vacuum bagging or resin transfer molding, a pressurized draw procedure, or another procedure. The resin 25 is cured at step 390 using an autoclave, mold, or another known device. In one embodiment, the tension of tow(s) 20 or 20A and 20B provides pressure that cures the composite 10.

As shown, additional plies can be applied at step 400 to the repaired area, which had previously been the delaminated area 14 and other portions of composite 10. The additional plies provide reinforcement and cover repaired area to help keep contaminants from being introduced to the interior of composite 10 through holes 18. The additional plies are cured at step 390 to composite 10.

In another embodiment, processing steps 380 can include a step 410 that removes tow(s) 20 or 20A and 20B from one or more surfaces of composite 10. The removal leaves tow(s) 20 or 20A and 20B in holes 18 flush with one or more surface of composite 10. The removal of tow(s) 20 or 20A and 20B can be accomplished by known techniques including grinding, laser removal, or other cutting methods.

After processing step 380, method 300 proceeds to an inspection step 420. Inspection 420 determines if delaminated area 14 of composite 10 has been fully repaired. If composite 10 is not repaired composite 10 should be scrapped. Inspection can be performed by a tap test, a sonic test, or by other known means.

FIG. 5A is a cross-sectional view of one embodiment of repaired composite 10A with tow 20 extending therethrough and additional plies 22A and 22B being applied thereto.

In the embodiment shown in FIG. 5A, tow 20 is stitched through holes 18 in an over-under stitch manner 30. Thus, the single tow 20 extends into and through each hole 18 and travels from a first exterior surface 24A to a second interior surface 24B of composite 10A in an alternating pattern. Tow 20 is comprised of a lightweight material that can match the composition of the material used for plies 12. In one embodiment, tow 20 is comprised of Kevlar. In other embodiments, tow 20 is comprised of glass fiber.

Additional plies 22A and 22B are applied to composite 10A on surfaces 24A and 24B thereof. More particularly, plies 22A are applied to first surface 24A and second surface 24B of composite 10A in repaired area 14R. Plies 22B are additionally applied over plies 22A on both sides of composite 10A.

Additional plies 22A and 22B can comprise a light weight material used in the aerospace industry such as Kevlar, carbon fiber, fiberglass, basalt, and/or ceramic fiber. Additional plies 22A and 22B can but need not match the composition of the material used for plies 12. For example, plies 22A can be comprised of Kevlar and plies 22B can be comprised of fiberglass.

Additional plies 22A and 22B can be applied and cured using known methods. Additional plies 22A and 22B provide reinforcement and cover repaired area to help keep contaminants from being introduced to the interior of composite 10 through holes 18.

Figure 5B:
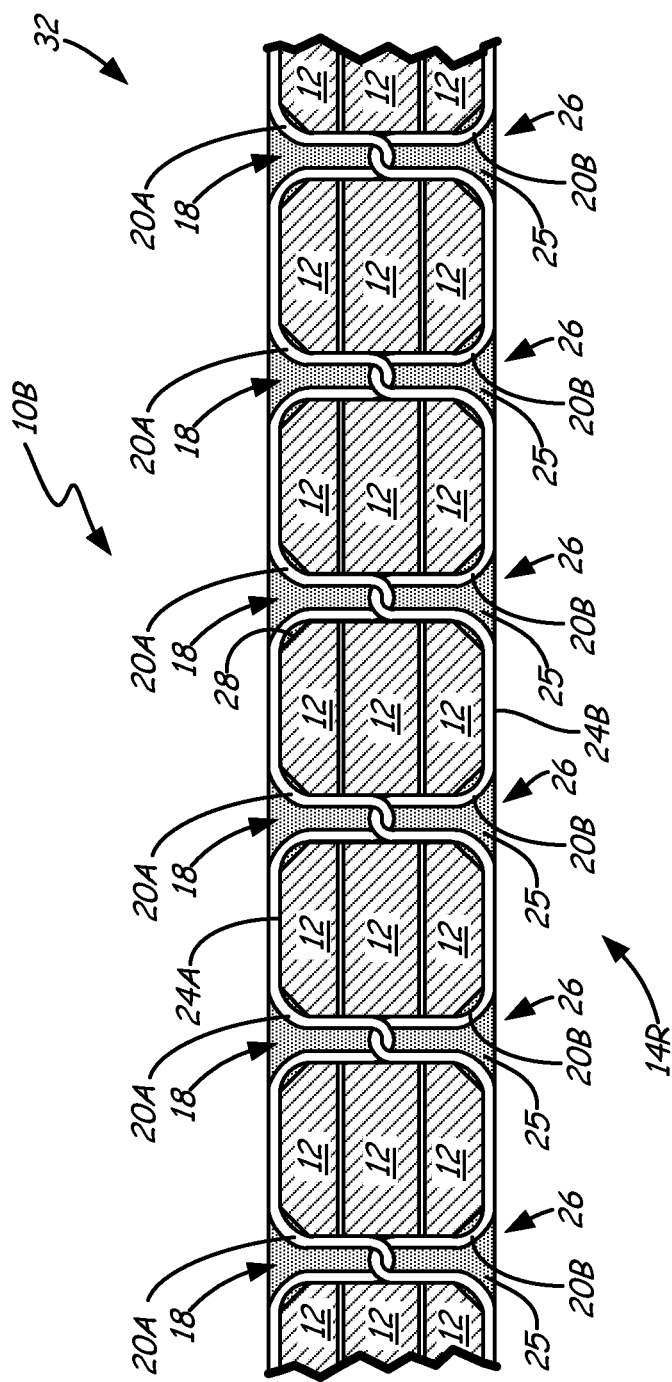
FIG. 5B is a cross-sectional view of another embodiment of the repaired composite with tows stitched into the plurality of holes in a lock stitch manner.

For the embodiments shown in FIGS. 5A-5C, holes 18 can be filled with resin 25 so that holes 18 no longer exist but are solids 26 comprising tows 20A and 20B and resin. The introduction of resin 25 can occur prior to, during, or after introduction of tow(s) 20 or 20A and 20B into holes 18 and curing of composite 10. Prior to filling with resin 25 (and generally occurring during drilling) chamfers 28 can be added to holes 18 along first and second surfaces 24A and 24B of composite 10C. When resin 25 has cured, chamfers 26 act to help hold the resin 25 and tow 20A and 20B solid 26 together similar to a mechanical rivet. Thus, the design of the holes 18 with chamfers 28 does not rely solely on bonding to the sides of holes 18 but additionally the head (bounded by chamfers 28) on each end of resin/tow solid 26 bonds to additional surfaces and can support tension loads (parallel to the axis of each resin/tow solid 26) as well as sheer loads (perpendicular to the axis of each resin/tow solid 26).

FIG. 5B shows a cross-sectional view of another embodiment of repaired composite 10B with tows 20A and 20B stitched into the plurality of holes 18. As shown in FIG. 5B tows 20A and 20B are stitched in a lock stitch manner 32. Tow 20A extends into each hole 18 and travels along first surface 24A of composite 10B. Tow 20B extends into each hole 18 and travels along second surface 24B of composite 10B. Tows 20A and 20B entwine each other within holes 18 to complete lock stitch 32. Holes 18 are filled with resin 25 to create resin/tow solid 26.

Similar to tow 20, tows 20A and 20B can be comprised of a lightweight material that can match the composition of the material used for plies 12. In one embodiment, tows 20A and 20B are comprised of Kevlar. In other embodiments, tows 20A and 20B are comprised of glass fiber.

FIG. 5C is a cross-sectional view of yet another embodiment of repaired composite 10C with tows 20A and 20B stitched in the lock stitch manner 32 and removed flush to first and second surfaces 24A and 24B of composite 10C. Similar to the embodiment shown in FIG. 5B, in the embodiment shown in FIG. 5C, tows 20A and 20B extend into each hole 18 and holes 18 are filled with resin 25 to create resin/tow solid 26. Tows 20A and 20B are removed from surfaces 24A and 24B of composite 10. Thus, tows 20A and 20B are disposed in holes 18 substantially flush with 24A and 24B surfaces of composite 10. The removal of tows 20A and 20B can be accomplished by known techniques including grinding, laser removal, or other cutting methods.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of repairing delaminated plies of a composite, the method comprising:
   drilling a plurality of holes in the plies wherein the holes are disposed across an area of the plies that is delaminated;
   stitching one or more tows into the plurality of holes;
   tensioning the one or more tows; and
   removing a portion of the one or more tows that extends above a surface of one or more of the plies.

2. The method of claim 1, further comprising:
   introducing a resin into the area of the plies that is delaminated; and
   curing the composite.

3. The method of claim 2, wherein the tensioning of the one or more tows provides a pressure on the plies.

4. The method of claim 2, wherein an autoclave provides a pressure that cures the composite.

5. The method of claim 2, wherein a mold provides a pressure that cures the composite.

6. The method of claim 2, wherein the resin is preimpregnated into the one or more tows.

7. The method of claim 1, further comprising applying one or more additional plies to the repaired area.

8. The method of claim 1, wherein the stitching comprises a lock stitch.

9. The method of claim 1, wherein the holes are disposed at intervals across substantially all of the delaminated area and a portion of the composite that is not delaminated.

10. The method of claim 1, wherein the composite comprises a rotor component of a gas turbine engine.

11. A method of repairing a delaminated area of a composite, the method comprising:
   drilling a plurality of holes in the composite wherein the holes are disposed across the delaminated area;
   introducing a resin into the delamination;
   stitching one or more tows into the plurality of holes;
   tensioning the one or more tows;
   curing the composite; and
   removing a portion of the one or more tows that extends above a surface of one of the plies.

12. The method of claim 11, wherein the stitching comprises a lock stitch.

13. The method of claim 11, further comprising applying one or more additional plies to the repaired area.

\* \* \* \* \*